US009519466B2

(12) United States Patent
Delsart

(10) Patent No.: US 9,519,466 B2
(45) Date of Patent: Dec. 13, 2016

(54) EXECUTABLE CODE FOR CONSTRAINED COMPUTING ENVIRONMENTS

(71) Applicant: Oracle International Corporation, Redwood Shores, CA (US)

(72) Inventor: M Bertrand Delsart, Grenoble (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/220,119

(22) Filed: Mar. 19, 2014

(65) Prior Publication Data

US 2015/0178054 A1 Jun. 25, 2015

Related U.S. Application Data

(60) Provisional application No. 61/919,654, filed on Dec. 20, 2013.

(51) Int. Cl.
*G06F 9/45* (2006.01)
*G06F 9/44* (2006.01)
*G06F 9/455* (2006.01)

(52) U.S. Cl.
CPC . *G06F 8/41* (2013.01); *G06F 8/30* (2013.01); *G06F 9/45525* (2013.01); *G06F 9/45533* (2013.01)

(58) Field of Classification Search
CPC .................. G06F 8/20; G06F 8/30; G06F 8/36
USPC .................................................. 717/106, 122
See application file for complete search history.

(56) References Cited

U.S. PATENT DOCUMENTS

| 6,112,025 A | 8/2000 | Mulchandani et al. |
| 6,272,677 B1 * | 8/2001 | Lam et al. ................... 717/170 |
| 7,051,323 B2 | 5/2006 | Lam et al. |
| 8,639,787 B2 * | 1/2014 | Lagergren et al. .......... 709/222 |
| 2014/0245275 A1 * | 8/2014 | Elias et al. .................... 717/168 |
| 2014/0282548 A1 * | 9/2014 | Lagergren et al. ............... 718/1 |

(Continued)

OTHER PUBLICATIONS

"Java HotSpot Performance Engine Architecture"; obtained at http://www.oracle.com/technetwork/java/whitepaper-135217.html; downloaded circa Mar. 18, 2014; 8 pages.

(Continued)

*Primary Examiner* — John Chavis
(74) *Attorney, Agent, or Firm* — Trellis IP Law Group, PC

(57) ABSTRACT

A system and method for facilitating adjusting computer code running in computing environments where writing of executable memory is restricted. An example method includes using a virtual machine to generate a first executable image from software code, and employing the first executable image to selectively modify the virtual machine and the first executable image, resulting in an updated virtual machine and a second executable image. The second executable image represents an updated version of the first executable image. To transform dynamic code, such as natively produced computer code, into one or more executable images for running on constrained devices, embodiments may leverage existing dynamic code generators (e.g., within Java HotSpot Performance Engine, also simply called HotSpot), selectively modifying them to generate different, i.e., updated code that is usable on subsequent runs of the associated software application, thereby effectively enabling modification of executable code used to run the software.

19 Claims, 4 Drawing Sheets

(56) References Cited

U.S. PATENT DOCUMENTS

2014/0310470 A1* 10/2014 Rash .............. G06F 12/0862
                                                711/126
2015/0032966 A1*  1/2015 Gupta ............. G06F 12/121
                                                711/133
2015/0062736 A1*  3/2015 Kim .............. G11B 20/1252
                                                 360/48

OTHER PUBLICATIONS

Burke, M.G., et al; "The Jalapeno Dynamic Optimizing Compiler for Java"; Proceedings of the ACM 1999 Conference on Java Grande; Jun. 1999; 13 pages.

Arnold, M., et al; "The Survey of Adaptive Optimization in Virtual Machines"; Proceedings of the IEEE, vol. 93, No. 2; Feb. 2005; 18 pages.

Muller, G., et al; "Harissa: a Hybrid Approach to Java Execution"; Proceedings of the IEEE Software, Institute of Electrical and Electronics Engineers; vol. 16, No. 2; Mar. 1999; 14 pages.

* cited by examiner

EXECUTABLE CODE FOR CONSTRAINED COMPUTING ENVIRONMENTS

CROSS REFERENCES TO RELATED APPLICATIONS

This application claims priority from U.S. Provisional Patent Application Ser. No. 61/919,654, entitled TRANSFORMING NATIVE INSTRUCTIONS INTO AN IMMUTABLE EXECUTABLE IMAGE, filed on Dec. 20, 2013, which is hereby incorporated by reference as if set forth in full in this application for all purposes.

BACKGROUND

The present application relates to software and more specifically to systems and methods for facilitating dynamic computer code generation and use in computing environments where writing of executable memory is restricted.

Software for facilitating dynamic code generation is employed in various demanding applications including network-distributed enterprise software, general Web-based applications, and so on. Such applications often demand portable platform-independent software that can efficiently adapt to features of a host device, including host devices with significant software behavior restrictions, such as executable memory-writing restrictions.

Dynamic or automatic generation of computer code on a host device, such as a mobile device or desktop computer, may enable rapid adjustments to computer programs to meet potentially changing needs of a given implementation. Dynamic code generation can be particularly suited for interpreted programming languages and associated interpreted applications or programs, where the applications are not first completely compiled before execution. In such cases, software interpreters or Just-In-Time compilers may process computer code during application runtime.

However, software leveraging dynamic code generation often cannot be ported to computing environments and associated operating systems that do not allow writing of executable memory, i.e., computing environments where only immutable executable code is supported. A computing device with an operating system (or other features) that restricts executable-code modification represents a restricted platform exhibiting an immutable computing environment. Similarly, an operating system that restricts writing of executable memory may be called a restricted or constrained operating system.

Conventionally, to overcome such restrictions and thereby enable dynamic interpretive programs to run in immutable environments (e.g., exhibiting constrained operating systems), the programs must typically interact with a remote server. For example, the programs may be executed by a remote server in communication with a target device.

However, use of remote servers to enable dynamic or adaptive code generation can be prohibitively slow and inefficient. Furthermore, such methods may require costly support for potentially time-consuming cross-compilation to account for different target platform characteristics, such Central Processing Unit (CPU) features, operating system endiannes, and so on, which define or characterize the runtime computing environment.

SUMMARY

An example method facilitates adjusting computer code running in computing environments where writing of executable memory is restricted. The example method includes using a virtual machine to generate a first executable image from software code, and employing the first executable image to selectively modify the virtual machine and the first executable image, resulting in an updated virtual machine and a second executable image, wherein the second executable image represents an updated version of the first executable image.

In a more specific embodiment, the first executable image is selectively cached in memory. An interpreter and/or a Just-In-Time (JIT) compiler of the virtual machine facilitates updating the first executable image with a modification. The first executable image is selectively run via the JIT compiler to facilitate generating the second executable image. Hence, executable images may be recursively updated by employing previous versions of the executable images to generate updated executable images.

The interpreter or JIT compiler of the virtual machine may include a code generator that is adapted to generate modified code, and then store the modified code in an assembler file. The specific example method may further include employing the assembler file to generate an executable library representative of the modified code. A compilation chain may employ the assembler file to facilitate generating the executable library.

The virtual machine may be implemented via a modified HotSpot (i.e., Java HotSpot performance engine) virtual machine, which includes the JIT compiler. The second executable image, i.e., the modified image, may be dynamically generated on a target device, also called the host platform or target platform. The modified image may be adjusted during generation thereof, based on one or more characteristics of the target device, such as Central Processing Unit (CPU) features. Such characteristics may be discoverable during initialization of the code generator used to dynamically generate computer code. Additional characteristics are obtainable via a profiler in the JIT compiler.

Hence, embodiments discussed herein provide various features and methods for facilitating transforming dynamically produced computer code, such as machine code, into one or more executable images, which may run on native devices and associated environments that otherwise restrict modification of executable computer code, e.g., executable files. Executable files maintained on a system with safeguards to prevent modification of the executable file, such as by self-modification, are called immutable executable images, or simply immutable images, herein.

Accordingly, certain embodiments discussed herein enable dynamically generated code, which is generated on a target device, to be patched. Conventional solutions lacked effective mechanisms for patching of dynamically generated code in constrained computing environments. Furthermore, conventional solutions could not automatically use dynamic information, since the code had to be generated on a different platform, such as a server host.

Certain embodiments discussed herein are readily implementable by adapting existing dynamic solutions, e.g., a HotSpot interpreter, for computing environments where such solutions cannot otherwise be seamlessly applied.

A further understanding of the nature and the advantages of particular embodiments disclosed herein may be realized by reference to the remaining portions of the specification and the attached drawings.

DETAILED DESCRIPTION OF EMBODIMENTS

Various example systems and methods discussed herein may facilitate adapting existing dynamic computing solutions for use in otherwise previously unsuitable computing environments.

Certain operating systems, such as iOS® (from Apple®, Inc.), inhibit executable memory from being writable. Accordingly, executable code in such computing environments is said to be immutable. However, computing environments and accompanying operating systems where only immutable code is supported can be incompatible with conventional efficient approaches based on dynamic code generation and/or patching operations that can be used for running software written via interpretative programming languages.

To overcome such issues, certain embodiments discussed herein are adapted to leverage existing dynamic code generators (e.g., within Java® HotSpot Performance Engine™, also simply called HotSpot™), selectively modifying them to generate updated, or otherwise different, code that is usable on subsequent runs of the associated software application, thereby effectively enabling modification of executable code used to run the software.

Figure 1:
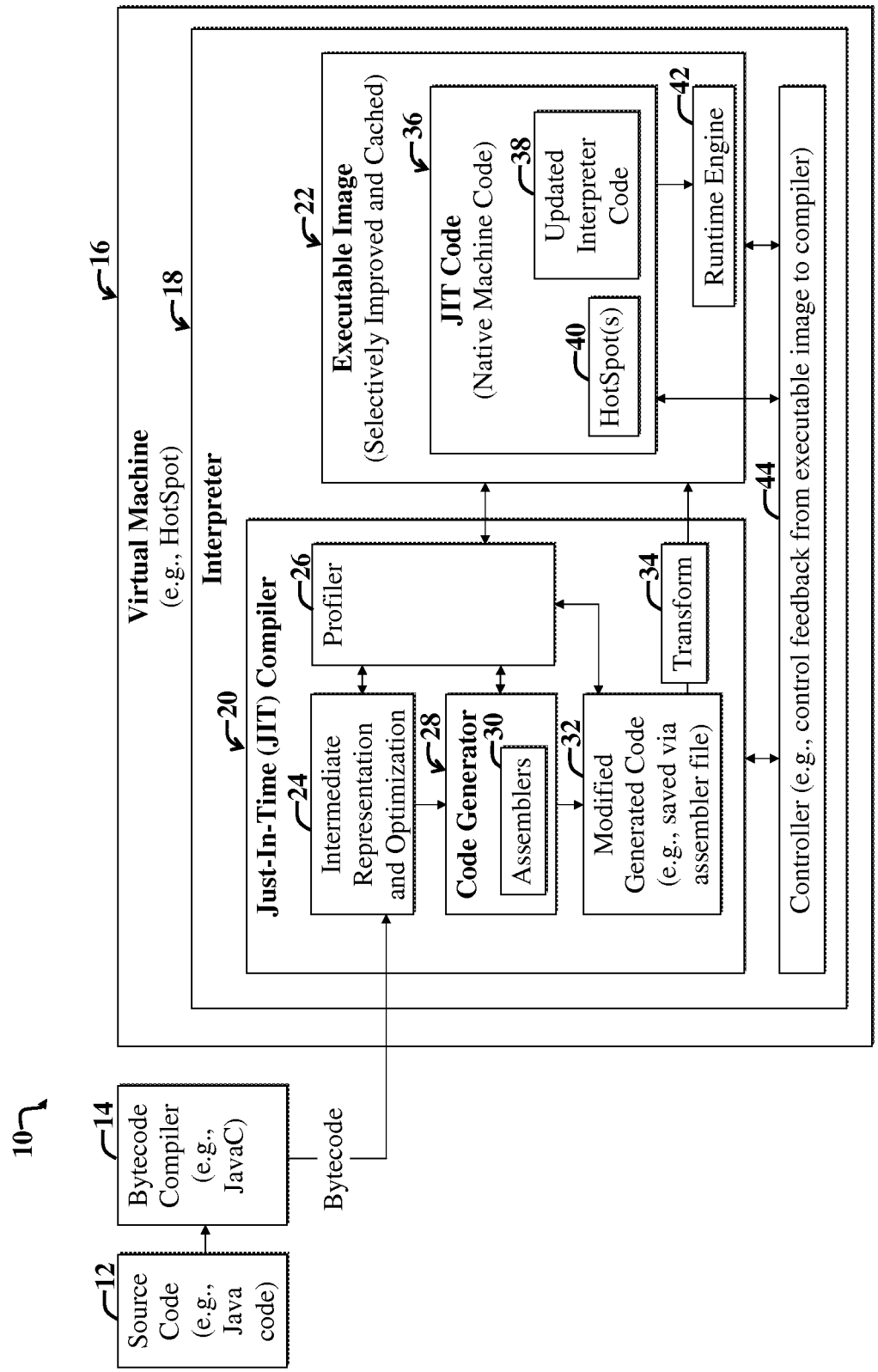
FIG. 1 is a diagram illustrating a first example system enabling transformation of dynamically produced patchable native instructions into an immutable executable image.

FIG. 1 illustrates an example system 10 that is adapted to facilitate running dynamically generated executable code 22 in a computing environment (e.g., of a computing device) that restricts modification of executable images. Well-known components and/or processes, whether hardware or software, such as hard drives, processors, operating systems, power supplies, class loaders, and so on, may not be shown or discussed in the figures or text. Note that various modules shown as 12-44 in FIG. 1 may be grouped and/or interconnected differently than shown. Modules may be combined with other modules, omitted or modified. Additional modules may be added. Modules may be called by different names and other changes made and still provide a system suitable for embodiments described herein.

The example system 10 may run in a computing environment, e.g., including a device and accompanying constrained or immutable operating system, such as iOS. The system 10 receives source code 12, e.g., Java code, which is converted into bytecode via a bytecode compiler 14. Resulting bytecode is forwarded to a virtual machine 16, such as a modified HotSpot virtual machine.

The example virtual machine 16 includes an interpreter 18 with a Just-In-Time (JIT) compiler 20. The JIT compiler 20 includes various modules 24-34, which are adapted to facilitate generating an executable image 22, which may be updated along with the JIT compiler itself 20. The produced executable image 22, which acts as native code (e.g., machine code produced or generated for, or on, the device on which the system 10 runs) may include updated interpreter code 38 along with HotSpot code 40. The executable image 22 may then be used to generate an update of itself, and so on.

The example JIT compiler 20 includes an intermediate representation and optimization module 24, which employs the bytecode from the bytecode compiler 14 to generate an intermediate code representation that is forwarded to a code generator 28 (which includes assemblers 30) for generation of modified generated code 32. A transformer 34 then facilitates transforming the modified code 32 into the executable image 22.

A profiler 26 may monitor various modules in the interpreter 18 to facilitate determining frequently used code or code that is otherwise suitable for inclusion in the executable image 22, which may be cached in local memory.

The executable image 22 may be run via a runtime engine 42. Various modules of the virtual machine 16 may communicate with one or more controllers, such as the controller 44 to facilitate communications and interfacing therebetween to meet the needs of a given implementation.

Note that in the present example embodiment, code is still dynamically generated on the targeted device (even if it cannot be used immediately due to the execution constraints). This allows automatic optimization of the code for that device, using for instance the actual CPU features (discovered when the code generator 28 is initialized) or profiling information collected while running the application on the device.

In a particular embodiment, example system 10 implements an iterative process. A previously generated interpreter can be used to start executing a Java application on the device and produce the corresponding JIT code 36 (without using that JIT code immediately). The new image 22 will contain both the JIT code 36 and a new version of the interpreter 38. More generally, the image produced by previous executions on the device is used by new runs on the device to create a new improved image.

The example system 10 can use the dynamic code generators already within HotSpot, modifying them to generate slightly different code (i.e., iteratively updated code) that is later saved and transformed into executable code usable on future runs of the application. The system 10 may also leverage relocation and patching mechanisms that exist in HotSpot, modifying them to enable patching of slightly different code, e.g., patching iterative updates.

The native JIT code 36 is generated on the actual targeted device, based on its effective Central Processing Unit (CPU) features. This also allows the Hotspot JIT to be used as is, letting the profiler 26 determine how to optimize execution as, for example, by detecting frequently used portions of code and compiling the code into HotSpots 40. The current saved format may be stored via one or more assembler files (e.g., of the assemblers 30) that can be converted to a native executable library directly or via a compilation chain.

Embodiments provide for dynamic code programs to run efficiently in HotSpot. Embodiments can leverage HotSpot execution features to facilitate generating an executable image usable in immutable computing environments.

The system 10 facilitates implementing a method for transforming an application that uses dynamic code generation (like HotSpot interpreter and Just-In-Time compilers) into something that can be used when dynamic code generation or patching is not suitable, either because of the use case (code shared among several processes) or because of the execution context (operating systems that do not allow applications to use memory that is both executable and writable)

Figure 2:
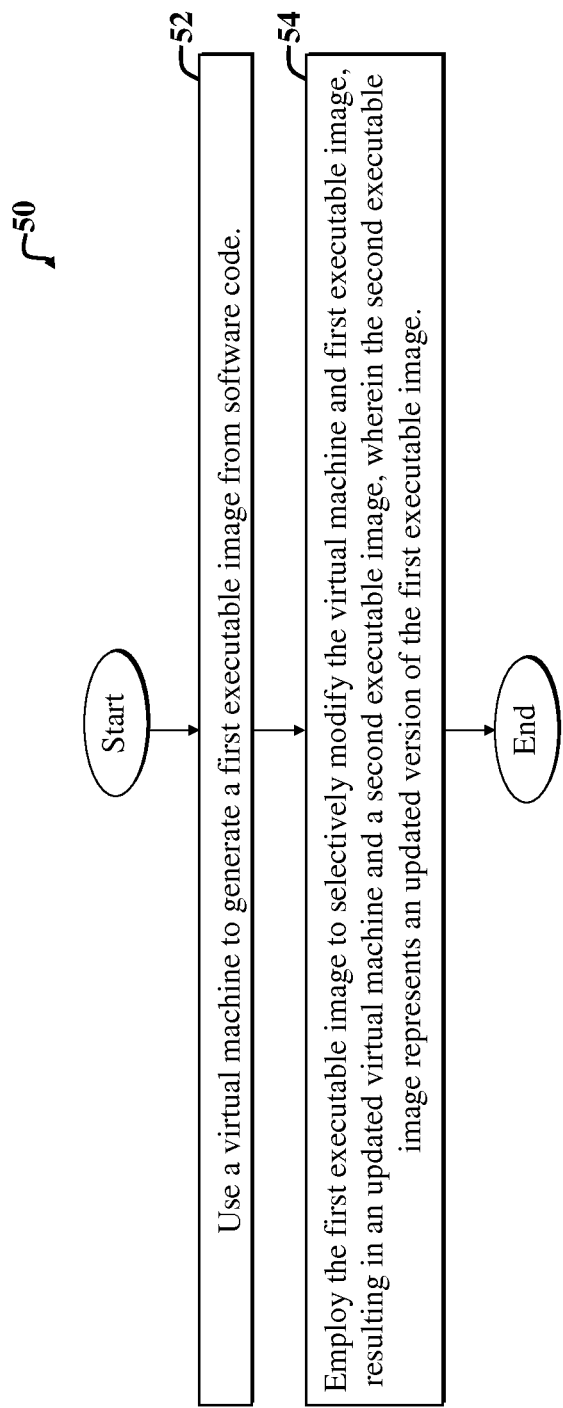
FIG. 2 is a flow diagram of a first example method adapted for use with the example system of FIG. 1.

FIG. 2 is a flow diagram of an example method 50 adapted for use with the device and system 10 of FIG. 1. The example method 50 is adapted to facilitate running dynamic code programs. For the purposes of the present discussion, a dynamic code program may be any program that is adapted to be compiled or otherwise interpreted on a device, called the native device. For example, certain dynamic code programs are adapted to be interpreted via an interpreter, and effectively complied as the program specified by the code runs.

The example method includes a first step 52, which involves using a virtual machine to generate a first executable image from software code.

A second step 54 includes employing the first executable image to selectively modify the virtual machine and first executable image, resulting in an updated virtual machine and a second executable image, wherein the second executable image represents an updated version of the first executable image.

The example method 50 may be augmented or otherwise modified without departing from the scope of the present teachings. For example, the method 50 may be modified to specify that the first virtual machine includes a Just-In-Time (JIT) compiler adapted to facilitate generating the second executable image, which can include (optionally updated) JIT code.

An alternative example method includes using a virtual machine to generate a first executable image from software code; selectively caching the first executable image; and employing the virtual machine and the first executable image to update the first executable image with a modification, resulting in a second executable image. The first executable image may be run to facilitate generating the second executable image.

The alternative example method may further include recursively updating the executable image by employing a previous version of the executable image to generate an updated executable image.

Difficulties can arise in transforming certain types of instructions. For example, where original code includes addressing or other referencing that is position-dependent upon where the code is loaded, such addresses or other absolute references may need to be modified. Sometimes original code to be transformed for execution in an immutable execution environment includes instructions or operations that self-modify the code and this behavior must be implemented in a different way. Additional details of specific examples of changing original code behavior for purposes of transforming the code for different computing environments, along with additional details, may be found in the above-identified U.S. Provisional patent application, which is incorporated herein by reference.

Figure 3:
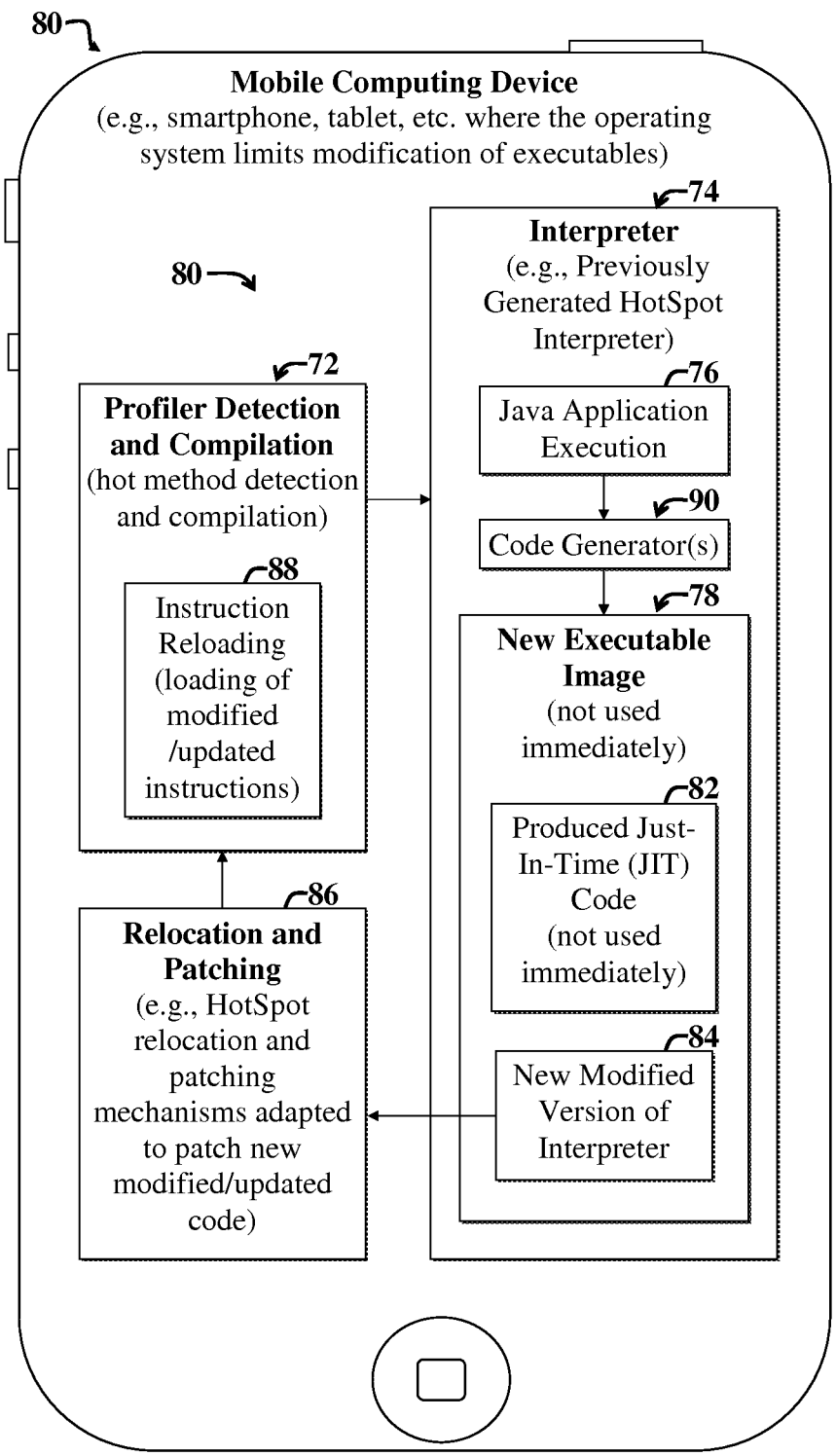
FIG. 3 is a diagram of a second example system illustrating key functional blocks employed in a method for recursively updating an executable image in an immutable computing environment.

FIG. 3 is a diagram of a second example system 80 illustrating key functional blocks employed in a method for recursively updating an executable image 78 in an immutable computing environment 70. The example system 80 includes a recursively updated interpreter 74 in communication with a profiler detection module 72 and relocation and patching mechanisms 86.

Note that groupings of various modules of the system 80 may vary, without departing from the scope of the present teachings. For example, the profiler detection module 72 and relocation and/or patching mechanisms 86 may be included in the interpreter 74, and certain modules shown included in the interpreter 74 may be included outside of the interpreter 74, without departing from the scope of the present teachings.

In addition, for clarity, various modules are not particularly called out in FIG. 3, such as indirection arrays, metadata parsers, macro assemblers, memory managers (and associated garbage collection heaps), individual C1 and C2 compilers (names of compilers included within HotSpot), and so on, but those skilled in the art with access to the present teachings may readily determine which components to implement and how to implement them as needed for a given implementation, without undue experimentation. Furthermore, those skilled in the art will appreciate that the system 80 of FIG. 3 may be implemented via a system similar to that shown in FIG. 1, without departing from the scope of the present teachings.

For the purposes of the present discussion, an interpreter may be any software or system that is adapted to execute instructions of a computer program without first compiling (i.e., converting to machine language or native code) the entire program. Code written via interpretive programming languages is often converted to bytecode before the bytecode is processed as needed during execution. Certain interpreters may be implemented via virtual machines that are adapted to interpret and execute bytecode instructions in sections (e.g., individual bytecodes) and execute the sections in series. The virtual machines may implement method calls by processing and executing individual bytecodes.

A JIT compiler may be a type of interpreter that selectively compiles code, such as bytecode, into native language or machine language, which is then cached for future execution from the cache. Sections of computer code corresponding to processes (i.e., methods) that are used frequently, i.e., are hot, can be cached as native machine code for rapid execution, while other less frequently executed portions can remain as bytecode before interpretation. Profiling methods may be employed to determine which processes are hot and which are not to facilitate determining which methods should be compiled to native code and cached. Certain JIT compilers may generate machine code for applications, class libraries, and so on, during application execution and immediately before invocation of corresponding method calls (that will use the machine code) in the code being processed.

The example interpreter 74 includes an application execution module 76, which may execute code written in interpretative programming languages, such as Java. The execution engine 76 may be implemented as a modified HotSpot execution engine. Code generators or producers 90 may monitor application execution to facilitate producing new code, such as the new executable image 78.

The new executable image 78 includes produced JIT code 82 and the new modified version of the interpreter 84. During production of the JIT code 82, metadata, such as CPU information discovered during initialization of the interpreter 74, and profile information discovered during application execution is leveraged to produce the JIT code 82 and the new modified version of the interpreter 84. The metadata may be parsed based on relative code offsets. Known offsets may be preserved for future runs of the Interpreter 74, as discussed more fully below.

The new executable image 78, which may represent dynamically generated code, does not require storage in conventional executable memory. For example, the new executable image 78 may be saved via directly generated native libraries and/or via low-level classes, e.g., assemblers of assembler files. Such libraries or files may be converted to executable libraries during compilation of the executable image 78 by a compilation chain of the profiler detection module 72. For the purposes of the present discussion, a compilation chain may be any set of computer code used to implement JIT compilation.

For the purposes of the present discussion, dynamically generated code may be any automatically produced code. Automatically produced code may be produced by software based on varying computing environment contexts or conditions. Dynamically generated code (also simply called dynamic code) is said to be natively produced when it is automatically generated on a target device or platform, such as represented by the computing environment 70. In various embodiments discussed herein, the dynamic code is natively produced, and hence, the terms "dynamic code" and "natively produced" code may be employed interchangeably herein.

The relocation and patching mechanisms 86 may represent modified HotSpot relocation and patching mechanisms, which are adapted to patch new modified/updated code, such as code represented by the new modified version 84 of the interpreter 74. The relocation and patching mechanisms 86 may employ native instruction classes to facilitate managing executable code and to enable patching of the new modified version 84 of the interpreter 74. The modified version 84 of the interpreter 74 represents computer code usable to replace the interpreter 74 upon reloading, as discussed more fully below.

After patching the new modified version of the interpreter 84, the profiler detection and compilation module 72 employs an instruction reloading module 88 to reload the interpreter 74, i.e., replace the interpreter 74 with an interpreter representing the new modified version 84. Hence, the instruction reloading module 88 is adapted to facilitate executing the code corresponding to the new modified version of the interpreter 84.

The profiler detection and compilation module 72 is further adapted to detect hot methods, i.e., frequently run processes, and then load any patched or relocated instructions as needed to implement the new modified version 84 of the interpreter 74 in place of the interpreter 74. The profiler detection and compilation module 72 may include a compilation chain, or may otherwise communicate with a compilation chain, to facilitate converting assembler files of the new modified version of the interpreter 84 into executable libraries usable to generate an immutable executable image for running the interpreter 74. Executable files maintained on a system with safeguards to prevent executable file modification are called immutable executable images, or simply immutable images herein.

Accordingly, the new executable image 78 represents dynamically generated code on a target device, e.g., a smartphone representing the computing environment 70. The dynamically generated code 78 may be automatically optimized for the device 70 based on CPU features and other information discovered during initialization of the code generator 90 and profiling information collected while running the application 76.

In summary, the system 80 employs an iterative process, which uses a previously generated interpreter 74 to start executing a Java application 76 on the device 70; to produce corresponding JIT code 82; and to generate a new executable image 78 that includes a new version 84 of the interpreter 74. The image produced by previous executions may be used by new runs on the device 70 to create a new and improved image 84. Relocation and patching mechanisms 86 are adapted to patch new code corresponding to the new modified version 84 of the interpreter 74. Accordingly, the dynamic code 78 generated on the target device 70 may leverage CPU features, profiling information, and so on, to generate native executable images usable as recursively updated interpreters.

Implementations of the present embodiment may leverage dynamic code generators already within commercial virtual machines, such as HotSpot, modifying them to generate slightly different code that is later saved and transformed into executable images 78, which are usable on future runs of the application 76.

Similarly, commercial relocation and patching mechanisms may be enhanced to enable patching of the slightly different modified code 84. Since the native modified code 78 is generated on the actual targeted device 70, based on its effective CPU features, and so on, certain commercial JITs, such as a HotSpot JIT, may be used virtually as is. The profiler 72 may determine which methods are hot while running the interpreter 74 and then compile them. Resulting reloaded executable instructions will be equivalent to what has been generated, i.e., equivalent to the new executable image 78. Note saved format for the executable image 78 includes an assembler file that can be converted to an executable library by a compilation chain. Alternatively, the new executable image 78 may be directly generated as a native code library.

Note that generated code, e.g., code output by the code generator 90, is modified to be valid for use in a different context (e.g. an alternate processes or future runs). Conventionally, values and addresses that were embedded in the code and that were dynamically modified during execution would not be modifiable when executable code is protected from writing.

To address this issue, assembler classes may be called using location information, such as values and metadata arguments. The location information is used to generate native code that reads the value at a particular index from an indirection array in writable memory. Instead of reading values associated with default index locations used by dynamic code, a new indirection index may be allocated if an existing index is not employable.

For the purposes of the present discussion, an indirection array may be any programming language mechanism (e.g., an array, table, etc.) or object that is adapted to store references (e.g., names, containers, etc.) to other objects or mechanisms (e.g., classes). The array may be in a writable data section of memory on a target platform and may accommodate references to symbolic information, numerical values, string pointers, and so on.

For each index in the indirection array, relocation type and value are memorized to enable reuse (when sharable) and to facilitate subsequent saving of the indirection array and sufficient information to properly initialize the array on future runs. Initialization values may be, for example, addresses of C++ code within the JVM used to implement the interpreter 74 or other addresses within the generated code corresponding to the new executable image 78. Such initialization values are replaceable in the saved format (e.g., assembler file) by symbolic information resolved transparently at link-time by the operating system or compilation chains.

To facilitate patching, instead of patching executable code, native instruction implementations may recognize the indirection instructions, and then automatically extract an index from the instructions as needed for patching an entry at that index.

To ensure that constant values and addresses that are embedded in the code are correct for alternate processes or future runs, HotSpot code may be readily enhanced to specify new relocation types, as needed, for use with indirection arrays.

To ensure that any lazily generated stubs (i.e., stubs that are not produced until the first time they are needed, as opposed to when they are available), e.g., optimization stubs for native method calls, are not missing from generated code, stubs for the interpreter 74 can be optimized for native method calls. Code producers can be enhanced to associate unique names with these stubs to enable reloading of the stubs from the saved executable code. This may help to ensure that new code generated for missing stubs is not activated on systems not supporting dynamic code.

For the purposes of the present discussion, a stub may be a section of code used as a placeholder or substitute for other programming language functionality. An example stub represents a declared class, function, procedure, or other routine that returns valid values to a caller to the location of the stub.

To support compiled code, mandatory stubs are accommodated when switching between native, interpreted, and compiled code. This can be done by ensuring that the mandatory stubs are not lazily generated, but instead are uniquely named and are generated for all compiled methods at compilation time.

Conventionally, compiler-related dynamic stubs are Inline Caching (IC) stubs. These relatively short-lived dynamically patched IC stubs are used during transition periods (e.g., for atomicity purposes) and regularly discarded. For the purposes of the present discussion, inline caching may be any technique whereby results of a previous call to a routine (e.g., method lookup) at a call site in a computer program are stored at the call site. Inline caching methods may facilitate runtime optimization, speeding up runtime method binding by remembering results of a previous method lookup directly at the call sight.

To implement certain embodiments discussed herein, existing HotSpot logic may be altered to use two immutable stubs that are parameterized by data arrays. Accordingly, instead of dynamically allocating and patching IC stubs, the data arrays may be dynamically allocated and patched. Note that generic immutable stubs, complemented with the patchable dynamic data array, behave like the original patchable dynamically generated code.

Note that in general, HotSpot code generators (e.g., interpreter, compiler, and stub generators) leverage low level classes called assemblers to produce executable code. The code is later managed through native instruction classes to handle code patching. Those skilled in the art will appreciate that implementations of embodiments discussed herein involving enhancements to existing HotSpot code generators may be implemented via adjustments to low-level layers (e.g., assembler classes and native instruction classes) of the HotSpot code generators.

To ensure that dynamically modified sequences of code remain patchable, certain existing HotSpot methods may be extended to associate patchable code with an indexed entry in the indirection array. Conventionally, these existing HotSpot methods involved jumping to extra native instructions that were calling the runtime to perform additional logic on the first runs (e.g., class loading, class initialization, field resolution, and so on). After these extra steps, the initial jumping code was replaced by optimized instructions. Resolved constants were directly loaded in a register or resolved using an offset or address to access memory. Those skilled in the art with access to the present teachings may readily extend such existing HotSpot methods to associate the patchable code with an indexed entry in the indirection array, as needed to meet the needs of a given implementation.

To minimize requisite changes to existing HotSpot code, extra native instructions calling the runtime may be jumped to only when the associated indirection entry has a particular value indicating that it has not yet been properly initialized. Alternatively, initialization values can be used to force instructions that use the particular value to cause an error. This error can be trapped and recognized by the runtime, thereby triggering execution of the extra runtime logic. In both cases, the patching performed by the runtime updates the indirection value instead of modifying the code.

Note that in the present example embodiment, mechanisms for saving generated code, e.g., saving the new executable image 78 of FIG. 3, and reloading it in future runs or other processes, include support for incremental code generation. Furthermore, the example interpreter 74 is adapted to support metadata (e.g., metadata specifying code sequence type, stack used for that sequence, ordinary object pointer (oop) maps, and so on) used by HotSpot for generated code that is being executed.

Metadata is often parsed based on relative code offsets. In the present example embodiment, native code is directly generated, and offsets are known and preserved for future runs. To implement certain embodiments discussed herein by editing and a HotSpot interpreter, those skilled in the art may readily determine which metadata is referenced via absolute addresses, and replace then replace the absolute addresses with relative addresses as needed.

Note that each code sequence (or group of code sequences) is associated with a unique name. The name allows retrieval of a previously generated version of that code sequence (or group of code sequences) and use of the retrieved version instead of a newly generated version.

Remapping may be used to support incremental generation. For each piece of generated code, the newly generated code address is associated with the address of the reloaded version (e.g. the pre-generated version already in the executable image). The reloaded version is sent back to the code producer (since the newly generated version is not executable).

When generating instructions that jump to or otherwise call a remapped address, the remapped address is used. This helps to ensure that generated code is consistent and does not reference a reloaded image. Such remapping may be performed transparently by lower assembler layers.

Furthermore, to facilitate runtime execution, generated code and the indirection array (or table) is dumped (e.g., onto a JVM memory heap used for dynamic memory allocation). Certain indirection array values may be handled automatically at link-edit time (e.g. by the compilation chain or the operating system linker). Other values may be set according to dynamically allocated addresses in the new process.

The new process parses the relocation information to discover which indexes need to be fixed and the saved value is sufficient to allow the new process to discover appropriate values for these indexes. In the present example embodiment, the dumped file also includes a dictionary that allows retrieval of the offset within the saved block corresponding to a given name.

Note that certain embodiments may support saving of JIT compiled code via complied code caching methods, whereby compiled code is saved in a data file with symbolic information, including a symbolic version of the compiled code.

On subsequent executions, the data file is reloaded, e.g., by the instruction reloading module 88. The compiler (e.g., as represented by the execution engine 76) then discovers previous results of the compilation, copies the saved code (called the pre-generated code) to the code heap (i.e., dumps the code), and then resolves all symbolic references when performing relocation (e.g., via the relocation and patching module 86).

Compiler optimizations can be turned off so that the generated code is less dependent upon context information, such as information assuming that a class is already initialized. Once loaded and installed, a method loaded from the cache behaves equivalently to a new dynamically generated method.

To facilitate handling dynamic code, a snapshot of a code heap (e.g., a heap maintained by a memory manager, such as a garbage collector accessible to modules of the system 80) may be saved along with linking information. The snapshot may then be transformed into executable code, and linked into a rebuilt JVM. When executing the new JVM, the linking information enables use of the pre-generated executable code in place of code in the new code heap.

While pre-generated executable code is not modified before being used, the present JVM (used to implement the system 80) is adapted to select the pre-generated version instead of the new code in the code heap. Back-end processing may automatically transform simple load, store, calls, and other types of instructions into instructions that are initiated by reading the instruction targets target from a patchable indirection array.

In summary, the system 80 enables running of dynamically generated executable code in a computing environment that otherwise restricts modification of executable images. Executable images may be recursively updated in immutable computing environments in accordance with the present teachings. Hence, the system 80 enables transformation of dynamically produced patchable native instructions into an immutable executable image.

Figure 4:
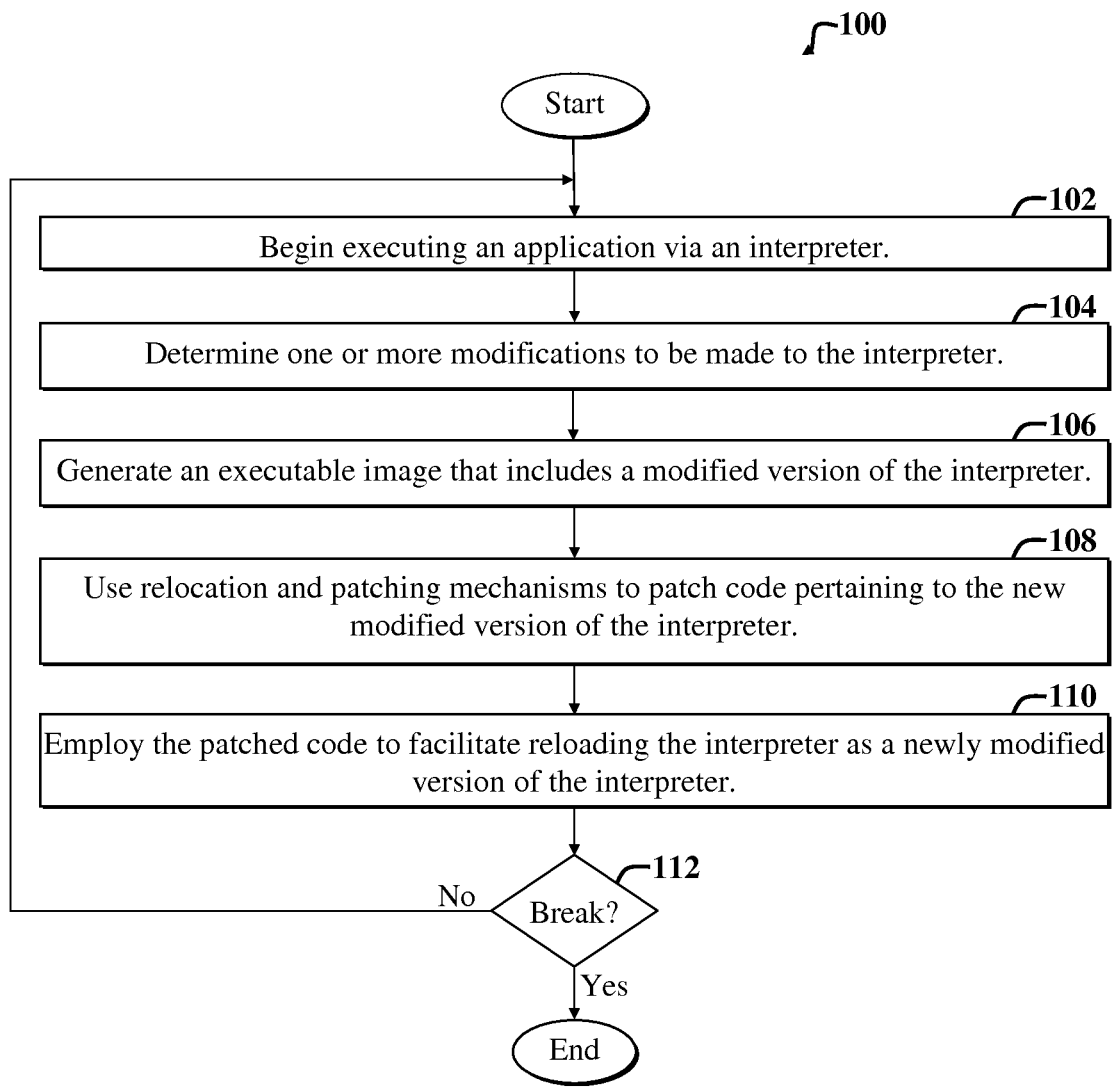
FIG. 4 is a flow diagram of a second example method adapted for use with the embodiments of FIGS. 1-4.

FIG. 4 is a flow diagram of a second example method 100 adapted for use with the embodiments of FIGS. 1-4. The method 100 facilitates running dynamically generated executable code in a computing environment that restricts modification of executable images.

The second example method 100 includes an initial execution step 102, which includes beginning execution of an interpretive application (also called interpretive program), i.e., an application that is adapted for processing via an interpreter or JIT compiler.

A determination step 104 includes determining, with reference to platform characteristics, one or more modifications to be made to the interpreter or JIT compiler.

A subsequent generation step 106 includes using the interpreter and accompanying code generators to generate an executable image that includes version of the interpreter that has been modified in accordance with the one or more modifications determined in the prior determination step 104. The generated executable image, which need not be immediately run, i.e., executed, may include JIT code along with the new modified version of the interpreter.

Next, a patching step 108 includes employing relocation and patching mechanisms, which may be included in the interpreter, to patch code pertaining to the new modified version of the interpreter. For the purposes of the present discussion, a relocation and patching mechanism may be any computer code that is adapted to facilitate adjusting references to portions of computer code (e.g., programming language classes) and/or replacing or inserting portions of computer code that are called by other computer code. Those skilled in the art may readily enhance or otherwise modify JIT relocation and patching mechanisms to enable patching of modified interpreter code for use with embodiments in accordance with the present teachings.

A subsequent reloading step 110 includes employing the patched code to facilitate reloading of the interpreter with a new modified interpreter, resulting in execution of the new modified version of the interpreter. A profiler, such as a HotSpot JVM (Java Virtual Machine) profiler may be readily adjusted to facilitate reloading the interpreter as the updated interpreter, e.g., via dynamic recompilation.

The steps 102-110 repeat, unless a break occurs, such as caused by shutting down a target device and/or underlying software, as determined in an example break-checking step 112.

The method 100 is illustrative and may vary, without departing from the scope of the present teachings. For example, additional steps may be added and certain steps may be omitted or rearranged, without departing from the scope of the present teachings.

Although the description has been described with respect to particular embodiments thereof, these particular embodiments are merely illustrative, and not restrictive. For example, although embodiments of the invention may be described with respect to a particular operating system or environment, such as iOS, and language, such as Java, various features or aspects of the embodiments can be used or adapted for use in other computing environments and languages, as desired. References to iOS and Java are merely illustrative examples. Although dynamic code generators are described for producing the original code that is to be transformed, any other suitable approach for generating original code may be adaptable for use with embodiments of the invention.

Furthermore, while certain embodiments are discussed with reference to dynamic updating of interpreters, embodiments are not limited thereto. Certain methods discussed herein may be adapted for use with ahead-of-time compilers and systems for sharing compiled code with different instances of JVMs, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for running dynamic code programs in an execution context that does not allow applications to use memory that is both executable and writable, the method performed by a computer system comprising the following acts:
   executing a virtual machine to generate first executable code in a first executable image from software code of an application, where the virtual machine includes optimizing functionality that analyzes execution of the first executable image to cache frequently used executable code and modifies executable code for efficient execution on the computer system;
   analyzing, using the virtual machine, the first executable code, when executed, to generate modified executable code;
   storing, by the computer system, the modified executable code as a second image separate from the first image;
   transforming the second image to a second executable image executable by the computer system to run the application;
   analyzing, using the virtual machine, the second executable image, when executed, to run the application to generate second modified executable code;
   storing, by the computer system, the second modified executable code as a third image separate from the first and second images; and
   transforming the third image to a third executable image executable by the computer system to run the application.

2. The method of claim 1, wherein the first virtual machine includes a Just-In-Time (JIT) compiler adapted to facilitate generating the second executable image.

3. The method of claim 1, with transforming further including:
   reloading the second executable image in future runs of the application.

4. The method of claim 3, further including selectively running the first executable image to facilitate generating the second executable image.

5. The method of claim 3, wherein the software code of the application includes bytecode.

6. The method of claim 5, wherein the virtual machine includes an interpreter and where the first executable image stores executable code of the interpreter.

7. The method of claim 6, wherein the interpreter includes a code generator adapted to generate modified executable code.

8. The method of claim 7, further including:
   storing the modified executable code in an assembler file.

9. The method of claim 8, further including:
   employing the assembler file to facilitate generating an executable library representative of the modified executable code.

10. The method of claim 9, further including:
    employing a compilation chain and the assembler file to facilitate generating the executable library.

11. The method of claim 6, wherein the interpreter is a HotSpot interpreter.

12. The method of claim 11, wherein HotSpot interpreter includes a Just-In-Time (JIT) compiler.

13. The method of claim 1, further including dynamically generating, on a target device, executable code included in the second executable image.

14. The method of claim 13, further including adjusting the dynamically generated executable code during generation thereof, based on one or more characteristics of the target device.

15. The method of claim 14, wherein the one or more characteristics includes a characteristic of a Central Processing Unit (CPU) of the target device.

16. The method of claim 15, further including discovering the one or more characteristics or information pertaining thereto, during initialization of a code generator used to dynamically generate executable code.

17. The method of claim 14, wherein the one or more characteristics includes information from a profiler.

18. An apparatus for running dynamic code programs in an execution context that does not allow applications to use memory that is both executable and writable, the apparatus comprising:
    one or more processors;
    a non-transitory processor readable storage device including instructions executable by the one or more processors for:
    executing a virtual machine to generate first executable code in a first executable image from software code of an application, where the virtual machine includes optimizing functionality that analyzes execution of the first executable image to cache frequently used executable code and modifies executable code for efficient execution on the computer system;
    analyzing, using the virtual machine, the first executable code, when executed, to generate modified executable code;
    storing, by the computer system, the modified executable code as a second image separate from the first image;
    transforming the second image to a second executable image executable by the computer system to run the application;
    analyzing, using the virtual machine, the second executable image, when executed, to run the application to generate second modified executable code;
    storing, by the computer system, the second modified executable code as a third image separate from the first and second images; and
    transforming the third image to a third executable image executable by the computer system to run the application.

19. A non-transitory processor readable storage device including instructions executable by one or more processor for running dynamic code programs in an execution context that does not allow applications to use memory that is both executable and writable, the non-transitory processor readable storage device including instructions for:

executing a virtual machine to generate first executable code in a first executable image from software code of an application, where the virtual machine includes optimizing functionality that analyzes execution of the first executable image to cache frequently used executable code and modifies executable code for efficient execution on the computer system;

analyzing, using the virtual machine, the first executable code, when executed, to generate modified executable code;

storing, by the computer system, the modified executable code as a second image separate from the first image;

transforming the second image to a second executable image executable by the computer system to run the application;

analyzing, using the virtual machine, the second executable image, when executed, to run the application to generate second modified executable code;

storing, by the computer system, the second modified executable code as a third image separate from the first and second images; and transforming the third image to a third executable image executable by the computer system to run the application.

* * * * *

UNITED STATES PATENT AND TRADEMARK OFFICE
CERTIFICATE OF CORRECTION

PATENT NO. : 9,519,466 B2  Page 1 of 1
APPLICATION NO. : 14/220119
DATED : December 13, 2016
INVENTOR(S) : Delsart It is certified that error appears in the above-identified patent and that said Letters Patent is hereby corrected as shown below:

In the Specification

In Column 4, Line 62, after "writable)" insert -- . --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*